United States Patent [19]
Hawkins

[11] 3,815,528
[45] June 11, 1974

[54] AGRICULTURAL DRY CHEMICAL UNDERGROUND APPLICATOR TOOL COMBINATION

[75] Inventor: Roy I. Hawkins, Pierce, Colo.

[73] Assignee: Hawkins Mfg. Inc., Pierce, Colo.

[22] Filed: July 3, 1972

[21] Appl. No.: 268,638

[52] U.S. Cl. .............................................. 111/85
[51] Int. Cl. ............................................. A01c 5/00
[58] Field of Search ........................... 111/7, 85, 86

[56] References Cited
UNITED STATES PATENTS

| 363,602 | 5/1887 | Crane | 111/86 |
| 2,242,426 | 5/1941 | Gregory | 172/156 |
| 2,598,121 | 5/1952 | Hannibal | 111/7 |
| 2,834,446 | 5/1958 | Wade | 111/86 X |
| 3,157,139 | 11/1964 | Spindler | 111/7 |

Primary Examiner—Stephen C. Pellegrino
Attorney, Agent, or Firm—Wilbur A. E. Mitchell

[57] ABSTRACT

An Agricultural Tool and dry granular chemical Applicator Combination comprising a horizontally underground moveable ½ rhombus blade adapted on such movement for forming a momentary underground air-vacuum-like pocket for gravity receiving granular dry chemical particles into that vacuum-like pocket and for thereby effecting distribution of said chemicals throughout that pocket.

4 Claims, 4 Drawing Figures

AGRICULTURAL DRY CHEMICAL UNDERGROUND APPLICATOR TOOL COMBINATION

The present invention relates to agricultural ground implement tools, and with reference to that type where a dry granular or similar chemical particles are applied in cooperation with an implement. More particularly, where such an implement is a ½ rhombus blade and which is dragged through the ground a few inches below the surface of the ground, and where such blade does not make an open furrow or ditch, but, instead, makes a momentary underground pocket or air-vacuum space, due to its positioning and ½ rhombus-like configuration, as the blade is drawn forwardly through the ground.

I have adopted a unique underground V-shaped or ½ rhomboid plow blade, both vertical and horizontal, to be drawn forwardly through the ground usually between rows of growing crop, and designed to form such an underground pocket or air-vacuum space momentarily, as it is drawn forwardly a few inches below the surface. That airvacuum underground pocket is completely earth enclosed, meaning, my blade does not form an open ditch but forms a small underground space or pocket immediately under that plow-blade.

It is, therefore, the principle object of this invention to provide such a V-shaped ½ rhomboid cultivator Plow-Blade, adapted to be drawn forwardly a few inches under the surface of the ground, so as to form a momentary underground pocket or air-vacuum space under that blade, as it is drawn forwardly through the ground, in combination with a gravity feed dry chemical discharging within that space under that blade.

Another object is to provide a gravity chemical conduit means positioned and adapted to permit fine particles or granulars of a dry chemical to be gravity fed downwardly for discharge under that blade into that momentarily formed air-pocket or vacuum space, as that ½ rhomboid implement is drawn forwardly through the ground.

A further object of this invention is to provide such an under-surface non-furrow forming ½ rhomboid wedge shape cultivator plow blade, for forming such an underground momentary pocket air-vacuum space thereunder, as the implement is drawn horizontally through the ground below the surface thereof, and which vacuum air-pocket vacuum space acts as a means for evenly effecting distribution of the dry chemical feed falling into that space by gravity and throughout that momentarilly formed air-vacuum pocket space.

Other and further objects will be apparent to those skilled in the art and from the following detailed explanation of my invention and the drawings herewith, in which.

Figure 1:
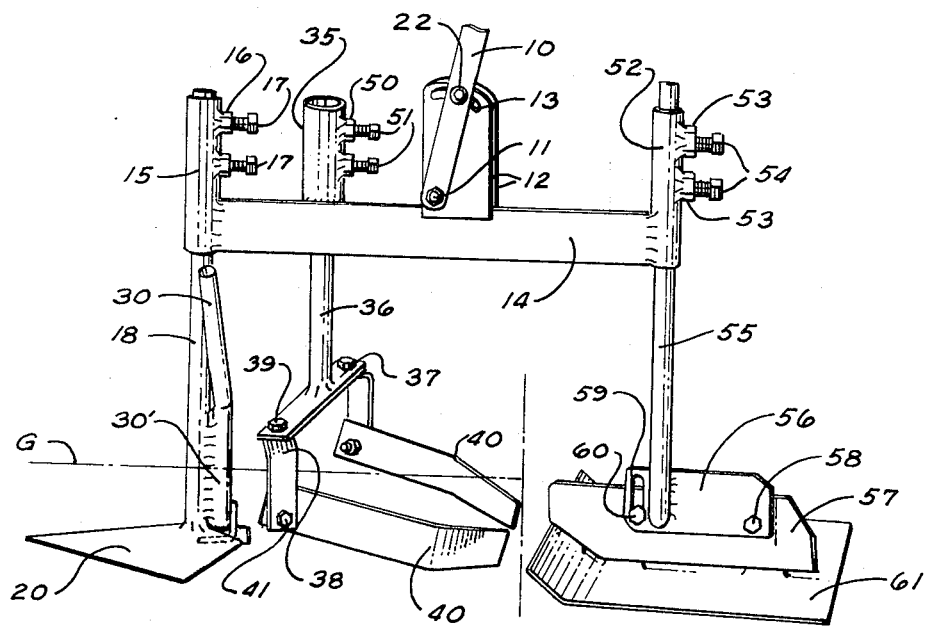
FIG. 1 is a side elevational view of my novel dry chemical cultivator attachment.

Referring to the drawings, it will be understood that a tractor, though not shown, has an adjustable vertical rigid carrying arm, which is partially shown as 10. I adjustably mount my improved applicator attachment combination pivotally onto the lower end of that arm 10, on a pivot bolt 11, as shown in FIG. 1.

I provide a rigid horizontal frame carrying bar 14 and secure a pair of upstanding parallel spaced plates 12 thereto and formed as shown. Parallel identical arcuate openings 13 are provided in the upper portion of each parallel plate 12, and a locking bolt 22 is extended slidably therethrough and also through the carrying arm 10. That carrying arm 10, of the tractor, has a lower end pivot bolt 11, extending through openings 13 and between said parallel guide plates 12. When lock-bolt 22 is loosened then the entire mechanism carried by 10 can be pivoted on pivot 11 and then reset on 11, by a tightening of that lock bolt 22 when the desired angle for the use of the attachment and its plow blade 20 is reached, with relation to the carrying arm 10, as may be desired from time to time.

The carrying bar 14 has 3 pipe cylindrical vertical holding collars 15, 35 and 52, as illustrated. Each of those collars has suitable peripheral locking screw-bolts, for holding a post slidably inserted within the collar, in any telescopic position of the post therein and to and by the collar, as at 16 and 17 of collar 15, 50 and 51 of collar 35 and 53 and 54 of collar 52.

Figure 3:
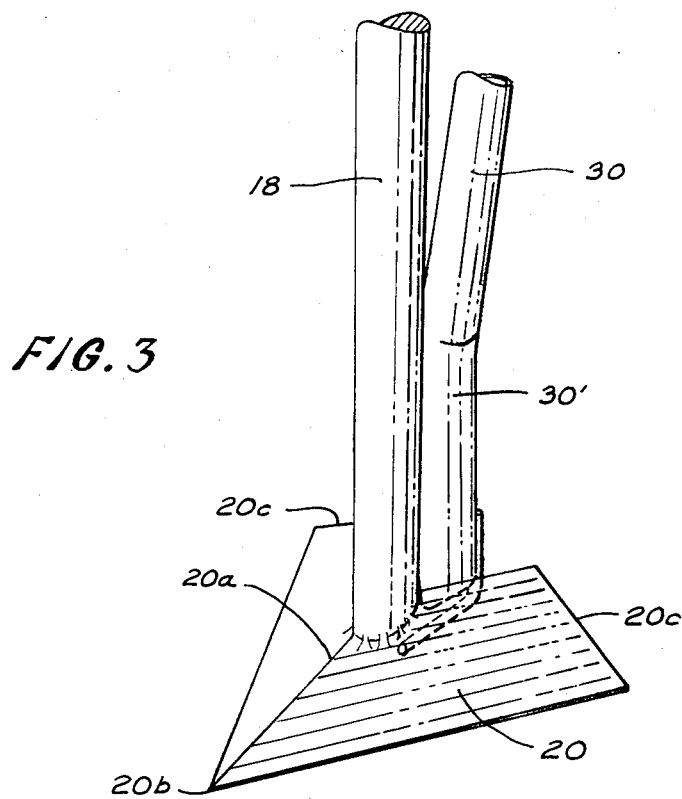
FIG. 3 is an enlarged persective of my novel ½ rhomboid wedge-shaped cutter blade, as affixed to the vertical carrying bar therefor.
Figure 2:
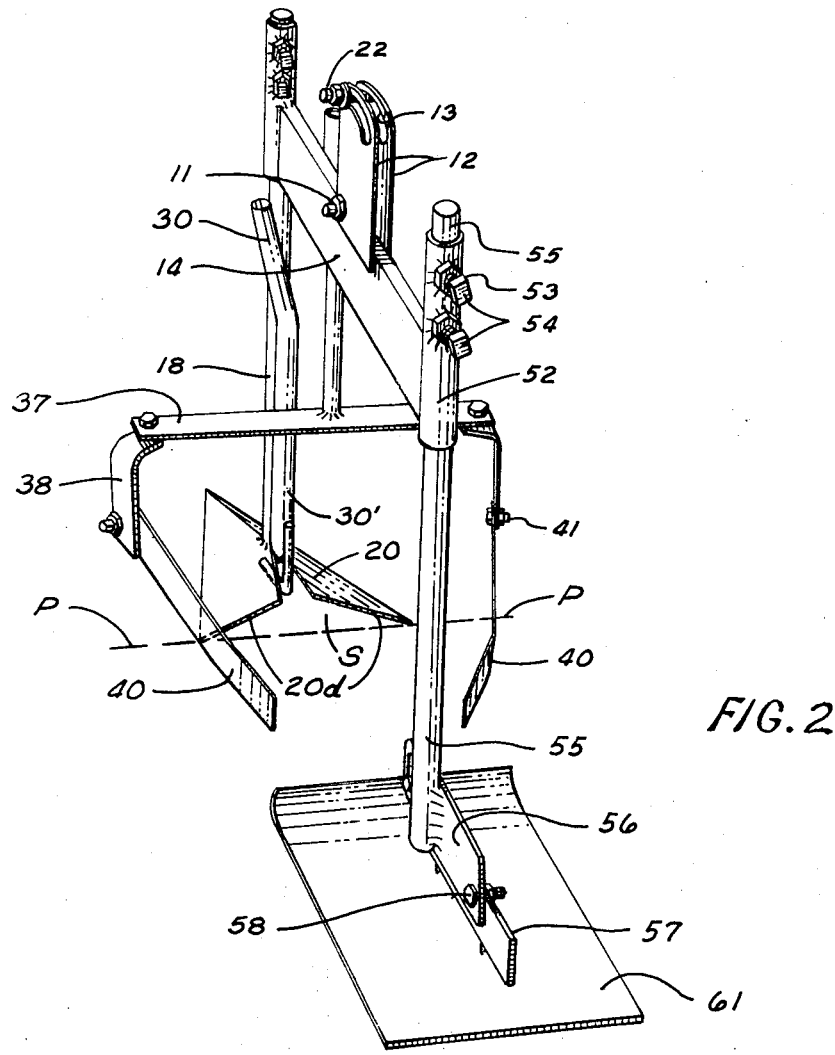
FIG. 2 is another rear elevation perspective view thereof.
Figure 4:
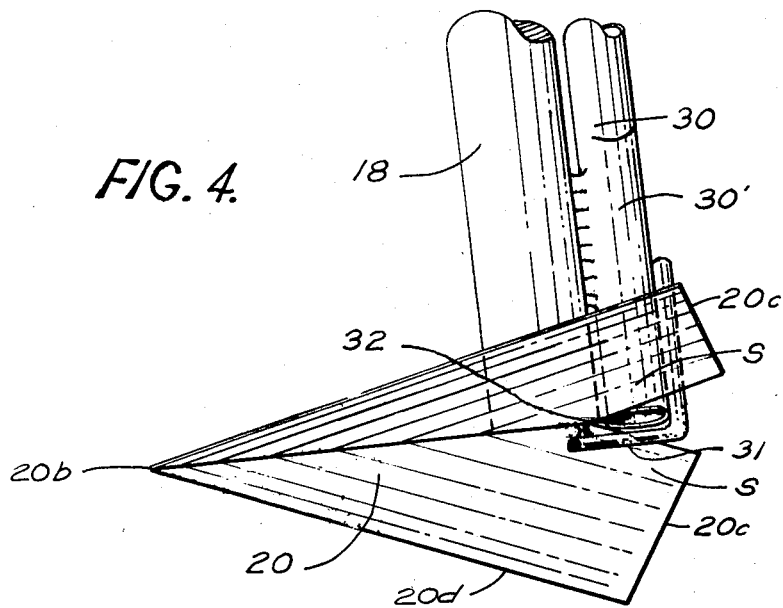
FIG. 4 is a further enlarged perspective view of my novel ½ rhomboid cutter blade, showing its underside and showing the gravity fed dry chemical pipe terminating thereunder.

My novel underground dry chemical cultivator and applicator, in this embodiment, consists of a novel V-shaped or wedge type horizontally pointed ½ rhomboid plow-blade 20, of the shape and configuration shown. That blade 20 has a slight elevational rearwardly raising apex ridge 20a, centrally and rearwardly from its point 20b. There are flared sides 20c of 20 which have their lower edges 20d extending horizontally below the plane of ridge 20a. It will be noted, in FIGS. 2, 3 and 4, that there is a resultant space S under 20 and above an extended horizontal plane line P under said sides 20c, as shown in FIG. 2, between said central ridge 20a and that extended line P. That space S is an important part of my invention, as it accomplishes a novel function during use, as the tractor forces that blade 20 horizontally forwardly under the surface of the ground with point 20a foremost or to the left, as illustrated. No open ditch or furrow is formed by that blade as it is drawn forwardly a few inches under the ground surface, but a unique different result occurs. Namely, that ½ rhomboid wedge plow 20, by its raised ridge central portion 20a, forms a space S, under that central portion of 20 and above the horizontal under edge extended plane line of the flared parallel side edges of blade 20, to be momentarily formed as an air-vacuum pocket or space under that blade and under the surface of the ground, as the blade 20 is moved forwardly or in the direction of the point 20b of the blade, as illustrated. That so formed vacuum in that space S formation is a momentary one so formed during such use, and which I have perfected as the means for causing a complete spreading of the dry chemical, gravity feeding down through my feed pipe 30, as will be explained, under that plow blade 20.

The dry chemicals are fed from a suitable elevated supply container by a conduit therefrom connected with the vertical gravity feed pipe 30, which is attached adjacent to and onto the vertical supporting post 18. Support post 18 is fixedly secured near the center of the upper extended ridge 20a portion of the plow-blade 20, as illustrated, and the plow 20 is carried by the post 18. Post 18 is of a size to fit slidably within collar 15, and is conventionally adjustably held by the latter upon tightly securing of the stud-screw-bolts 17, and their lock-nuts 16. Lock nuts 16 are provided on the screw-bolt 17, for conventionally securing the latter firmly in place, once 17 is seated as desired. The gravity feed pipe 30 is flattened at 30'. A round L-shaped bar 31 is secured to the lower end of 30', to extend as shown. The feed pipe flattened extension 30' is secured to the post 18 and in a position to be behind it, as the attachment is moved forwardly through the ground, being to the left as illustrated in FIG. 1. 30' is open at its lower end 32. The round reverse L-shaped chemical divider bar 31 has its upper leg secured to the lower portion of 30' and so that its right angular leg extends horizontally forwardly or to the left, as viewed in FIG. 1, and with that right angular leg in alignment directly below and spaced a short distance from the opening 32 of the pipe 30', as shown. It will thus be seen that the dry chemical falls by gravity down the pipe 30—30' and falls onto that right angular horizontal leg of the bar 31, and that said bar then acts to cause the quantity of chemical to fall to each side thereof and within the space S under the blade 20. It will thus be seen that the air-pocket or vacuum space S resultant suction, formed during the blade 20 underground movement operation, or to the left as illustrated, in such operation, effects a forward and horizontal spreading of the dry chemical form open end 32 of the discharge pipe 30 throughout that underground horizontal momentary air-pocket space S, under blade 20.

It is to be understood that, though not shown, the holding post 18, instead of being solid could be hollow and the chemical feed into that as the feeder pipe for the gravity falling of the dry chemical therethrough into the upper substantial central portion of the blade 20, instead of having the separate chemical gravity feed tube 30—30' as shown.

My underground cultivator blade 20 does not form an open trench, as it is pulled forwardly about 4 to 6 inches below the surface of the ground, by the tractor, or to the left as illustrated in FIG. 1, but forms the mentioned underground enclosed vacuum space S and in such formation the ground is only slightly loosened. To reasonably restore the ground to its original packed condition, I provide a pair of soil gathering ridge blades, 40, to form a slight row-hill, in line immediately behind where the vertical carrying post 18 went through the ground, in preparation for my packer sled sliding thereon, as illustrated in FIG. 1. I provide a round vertical slidable carrying arm 36, adjustably held within the collar 35 by lock-bolts 51 and their respective locking nuts 50. A cross bar 37 is rigidly secured horizontally as an inverted T at the lower end of the vertical bar 36. I pivotally secure a right angular pivotally adjustable bar 38, at each outer end of horizontal bar 37, by means of locking pivot-bolts 39, as shown. At the lower end of each angle bar 38 I have another locking pivoted bolt 41 and by which I secure vertical ridge blades, 40, as shown, in desired position. There are a pair of the surface soil gathering ridge blades 40 and of similar structure for each, as illustrated.

To the rear end of the horizontal carrying bar 14, through a collar 52 at that end provided as shown, I vertically adjustably slidably position a rigid bar 55. At the lower end of 55 I secure a packer sled 61, as by a suitable pivoting arrangement shown, by a fixedly mounted vertical rigid strap 56 to the lower end of 55. At the one end of 56 a slot 59 is formed. The sled 61 has a vertical rib 57. The rib 57 is suitably pivoted at 58 to the other end of 56 from slot 59. An adjustable locking slide-bolt 60 is inserted with its conventional head outwardly of the slot 59 at one of its ends and a locking nut on the other side of 57, not shown, as will be understood. When that locking bolt and nut 60 is released the horizontal plane of the underside of sled 61 can be pivoted on its pivot 58, within the limit of the slot 59 of the strap 56, to determine the angle to the horizontal of the plane of the lower surface of sled 61, and then the lock-nut of 60 is lock-set when the angle desired is reached. Thus, it will be seen that by raising or lowering of the carrying bar 55 in the collar 52, by adjustment of the lock-nuts 54, the amount of pressure to be applied by the under surface of sled 61 upon the earth ridge, formed by the soil gathering ridge bars 40 in front of sled 61, can be adjusted, as desired, in any given angular positions of carrying bar 14 with relation to tractor carrying arm 10, on pivot point 11.

The elevational view of my combined tools, as shown in FIG. 1, will be understood to illustrate the parts thereof as displayed at the dealer's or with the blade 20, the soil gathering members 40 and the soil packer sled 61, all resting on one surface, as a floor. Whereas, in actual use, it will be understood that the blade 20 is positioned to be drawn through the soil a few inches below the surface of the soil, as diagramatically illustrated in FIG. 1, with the dotted line G indicative of the surface of the soil with relation to that blade and to the soil gatherers 40. It will be further understood that, in actual use, the packer sled 61 is not in the same horizontal plane with the blade 20, as shown in FIG. 1, but, instead, its holding post 55 is raised sufficiently, within the collar 52, so that in use the sled portion 61 is substantially resting on that ground surface line G, to thereby pack any loosened ground on which it is pulled, as will be understood.

Having thus shown and explained a preferred embodiment of my invention, and since many changes can be made therein within the teaching thereof, I wish to be bound only by the hereunto appended claims.

What I claim and desire to secure by letter patent is:

1. In an agricultural chemical underground applicator tool having a frame adapted to be adjustably mounted on a tractor, a wedge-shaped blade means of ½ rhombus shape in a horizontal plane and having a forward point, rearwardly and outwardly diverging bottom edges and a center ridge extending rearwardly and upwardly from said forward point, said blade means being carried by an elongated support post on the frame for forward movement completely under the surface of the ground such that said blade means will create an open space under the ground and a momentary vacuum in said open space, said support post being of sufficiently narrow width so as not to form an open trench, supply means secured to said blade means for directing a supply of granular chemical into said open space as said vacuum is formed therein, divider means positioned beneath said supply means and within said open space to disperse granular chemical from said supply means into said open space, whereby the momentary vacuum formed in said open space serves to further disperse the granular chemical therein, means mounted on the frame rearwardly of said blade means for gathering soil on the ground surface behind said blade means, and means mounted on the frame rearwardly of said soil gathering means to compress the soil gathered by said soil gathering means.

2. The applicator tool of claim 1 wherein said blade means, rearwardly of said forward point, is of ½ rhombus shape in a vertical plane.

3. The applicator tool of claim 1 wherein said supply means is a gravity feed tube having its outlet positioned substantially at the mid-portion of said blade means.

4. The applicator tool of claim 3 wherein said divider means comprises a divider bar extending longitudinally under said feed tube outlet.

\* \* \* \* \*

UNITED STATES PATENT OFFICE
CERTIFICATE OF CORRECTION

Patent No. 3,815,528　　　　　　　Dated　June 11, 1974

Inventor(s)　Roy I. Hawkins

It is certified that error appears in the above-identified patent and that said Letters Patent are hereby corrected as shown below:

Column 1, line 23, "airvacuum" should read -- air-vacuum --; line 51, "momentarilly" should read -- momentarily --; line 61, "persective" should read -- perspective --. Column 3, line 30, "form" should read -- from --.

Signed and sealed this 1st day of October 1974.

(SEAL)
Attest:

McCOY M. GIBSON JR.
Attesting Officer

C. MARSHALL DANN
Commissioner of Patents